J. S. MARQUEZ.
SEED POTATO CUTTER.
APPLICATION FILED OCT. 17, 1921.
1,417,273.
Patented May 23, 1922.
2 SHEETS—SHEET 1.
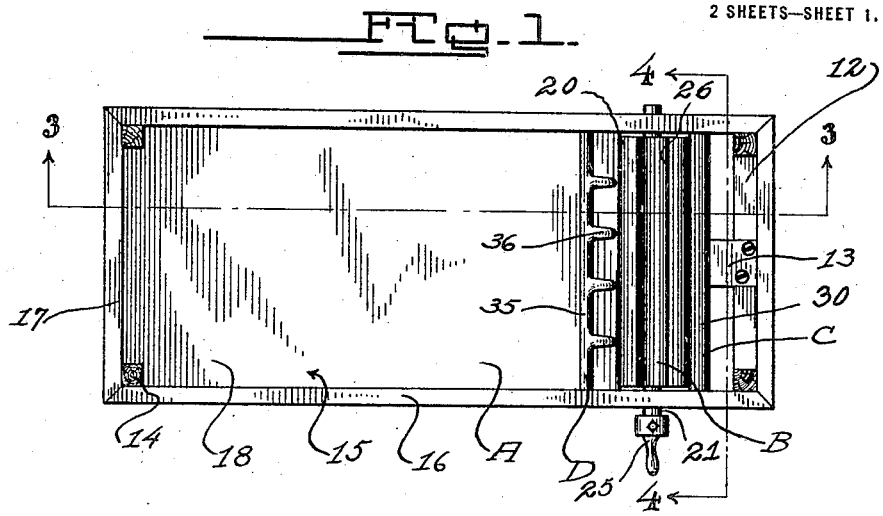
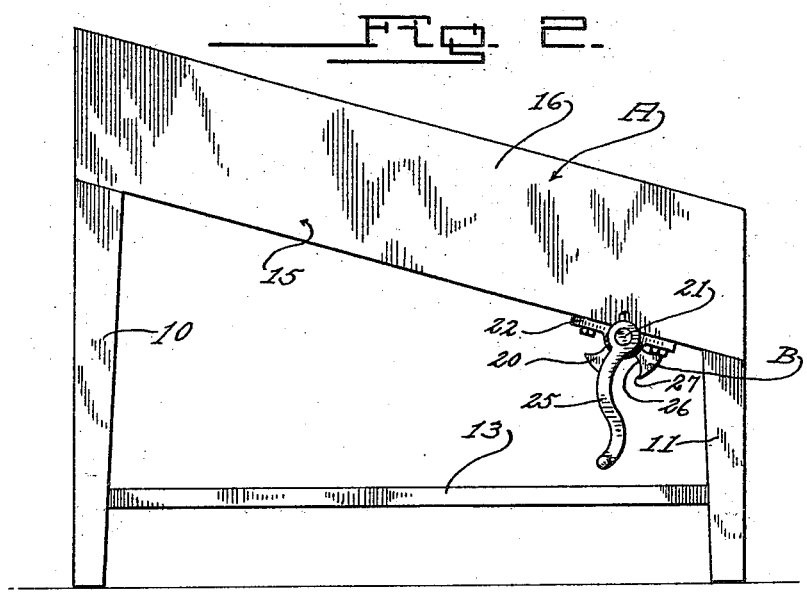
Inventor
Jose S. Marquez
By Lancaster and Allwine
Attorneys

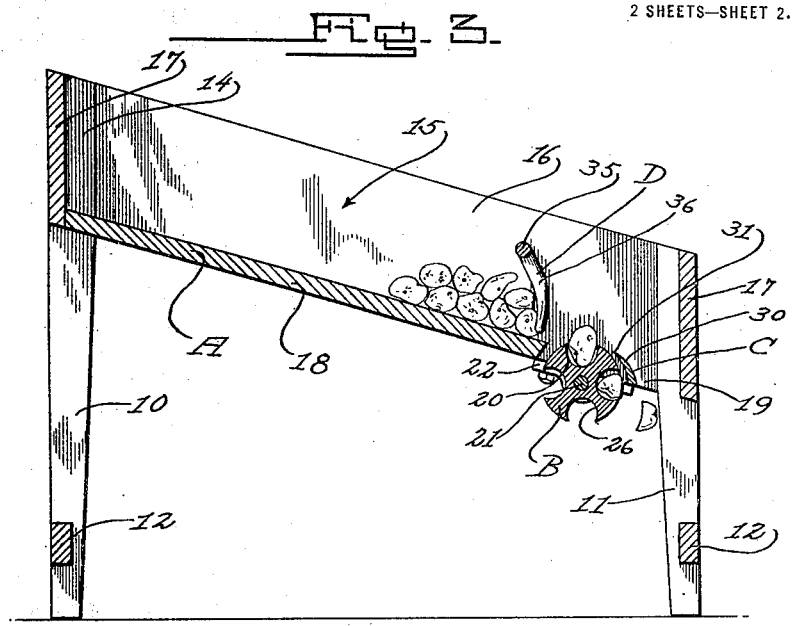
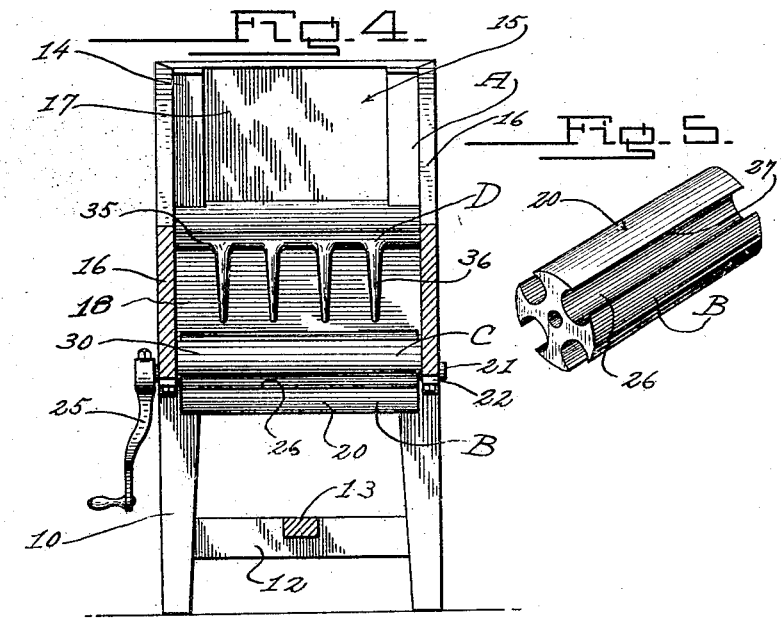

UNITED STATES PATENT OFFICE.

JOSE SABINO MARQUEZ, OF CAPULIN, COLORADO, ASSIGNOR OF ONE-THIRD TO J. LUIS RIVERA, OF LA JARA, COLORADO.

SEED-POTATO CUTTER.

1,417,273.  Specification of Letters Patent.  Patented May 23, 1922.

Application filed October 17, 1921. Serial No. 508,149.

*To all whom it may concern:*

Be it known that I, JOSE S. MARQUEZ, a citizen of the United States, residing at Capulin, in the county of Conejos and State of Colorado, have invented certain new and useful Improvements in Seed-Potato Cutters, of which the following is a specification.

This invention relates to cutters for seed potatoes and the primary object of the invention is to provide an improved machine which will quickly and effectively cut up the potatoes and thereby eliminate the lengthy and tiresome task of cutting up the potatoes by hand.

Another object of the invention is to provide an improved means for cutting seed potatoes embodying a bin or hopper for receiving and feeding the potatoes toward the cutting mechanism, the bin having a novel means arranged therein for preventing the choking of said feeding mechanism.

A further object of the invention is to provide a novel cutting mechanism for seed potatoes embodying a transversely extending knife and a rotatable roller having a plurality of grooves therein for receiving the potatoes and for moving the potatoes past the cutting knife.

A still further object of the invention is to provide an improved potato seed cutting machine of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification. in which drawings:

Figure 1 is a top plan view of the improved potato seed cutter.

Figure 2 is a side elevation of the machine.

Figure 3 is a longitudinal section through the machine taken on the line 3—3 of Figure 1.

Figure 4 is a transverse section through the machine taken on the line 4—4 of Figure 1, and Figure 5 is a detail perspective view of the novel means for feeding the potatoes past the cutting knife.

Referring to the drawings in detail, wherein similar reference characters designate corresponding parts throughout the several views, the letter A indicates the frame of the machine; B, the means for feeding the potatoes toward the cutting means; C, the cutting means; and D, the means for regulating the flow of potatoes toward the potato feeding means B in order to prevent the choking thereof.

The frame A includes the front and rear pair of supporting legs 11 and 10, and these pairs of legs are braced by transversely extending cross pieces 12. The pairs of legs 10 and 11 are connected together by means of the longitudinally extending rail 13. which serves to add rigidity to the frame. If desirable, the upper terminals of the legs 10 and 11 may be reduced as at 14 in order to form seats for the bin or hopper 15, which will now be described. The hopper or bin 15 includes the longitudinally extending side walls 16 and the transversely extending end walls 17. The hopper also includes a forwardly and downwardly inclined bottom wall 18, which is adapted to feed the potatoes toward one end of the machine. The legs 10 and 11 can be secured to the bin or hopper in any preferred manner.

The forward end of the bottom inclined wall 18 terminates short of the front pair of legs 11, and the front end wall 17, defining a slot or transversely extending opening 19, in which is positioned the potato feeding means B and the cutting mechanism C.

The potato feeding means B includes a transversely extending roller or drum 20, which is mounted upon a transversely extending shaft 21 for movement therewith. The shaft 21 has its terminals rotatably mounted in suitable bearings 22, which are bolted or otherwise secured to the lower edges of the longitudinally extending side walls 15. This shaft has secured to one terminal thereof a suitable hand crank 25, which serves as means for permitting the free rotation of the shaft 21 and the roller 20.

The roller 20 has formed in the periphery thereof at equi-distantly spaced points, a plurality of longitudinally extending grooves 26. These grooves 26 are preferably formed concaved or substantially circular shaped in cross section, in order to define the relatively sharp edges 27, which are adapted to cooperate with the cutting means C in order to effect the severing of the potatoes, as will be readily apparent as the description proceeds.

The cutting means C includes a transversely extending rigid knife 30, which has its terminals secured in any preferred manner to the longitudinally extending side walls 16. This rigid cutting blade 30 is curved transversely in order to conform to the configuration of the roller 20 and has its upper inner end sharpened as at 31 in order to engage the potatoes as the same are brought past the knife by the roller 20. As clearly shown in Figure 3 of the drawings, the rigid knife 30 is disposed relatively close to the periphery of the roller 20, thus insuring the severing of the potatoes as the same are moved past the knife.

In order to prevent the piling up of the potatoes over the roller 20, the retarding means D is provided. This retarding means D includes a substantially circular transversely extending rod 35, which has its terminals mounted within the side walls 16. This rod or shaft 35 has formed thereon a plurality of equi-distantly spaced teeth 36. These teeth 36 are curved arcuately and are normally disposed in the path of the potatoes and thus effectively keep the potatoes back from the roller and only permit a few of the potatoes to ride past the same at a time.

Owing to the formation of the roller, it can be seen that a plurality of potatoes can fit in the grooves at the same time, and thus a plurality of potatoes will be cut upon each rotation of the roller. In use of the machine, the potatoes are dumped directly into the bin or hopper 15 above the retarding mechanism D, and the handle 25 is then turned. The potatoes will ride past the retarding means D and drop into the grooves 26 and as the roller is rotated, the potatoes are brought into engagement with the cutting edge 31 of the rigid knife 30, which will cooperate with the sharp edges 27 of the roller, thus effectively severing the potatoes. It can be seen that as the roller is rotated a little further, the severed potatoes will drop therefrom, and if so desired, a suitable receptacle can be placed underneath the cutting mechanism in order to catch the severed potatoes.

If found desirable, the position of the roller can be readily reversed in order to permit different edges 27 of the grooves 26 to be brought into operative engagement with the potatoes, thus insuring a sharp edge, when one side edge of the grooves becomes dulled.

From the foregoing description, it can be seen that an exceptionally simple machine has been provided for cutting up seed potatoes, which embodies a minimum number of working parts, none of which are apt to become out of order and cause the operator any inconvenience.

Changes in details may be made without departing from the spirit or scope of this invention; but,

I claim:

1. A seed potato cutter comprising a potato receiving bin having a lower inclined wall terminating short of the forward end of the bin, a rigid transversely extending knife disposed in the bin in front of the lower wall, and a transversely extending rotatable roller carried by the bin and disposed intermediate the rigid knife and the front edge of the inclined wall having a plurality of potato receiving grooves formed therein.

2. A potato seed cutter comprising a bin including an inclined lower wall having the forward end terminating short of the forward end of the bin, a transversely extending cutting knife arranged in the bin in advance of the forward end of the lower wall, a potato feed roller rotatably mounted in the bin intermediate the forward end of the lower inclined wall and the cutting knife, and a retarding means for the potato disposed in the bin in rear of the potato feeding roller.

3. A potato seed cutter machine comprising a bin including a lower inclined wall having the forward end thereof terminating short of the forward end of the bin, a transversely extending rigid cutting knife disposed in the bin in advance of the lower wall, a rotatable potato feeding roller disposed in the bin intermediate the cutting knife and the forward end of the lower inclined wall, the roller having a plurality of potato receiving pockets formed therein for feeding the potatoes past the cutting knife, and a potato retarding means disposed in the bin above the upper surface of the lower wall in rear of the potato feeding roller including a transversely extending shaft and a plurality of depending arcuate tines.

4. A potato seed cutter comprising a bin including a lower inclined wall having its forward end terminating short of the forward end of the bin, a rigid transversely extending cutting knife carried by the bin and disposed in advance of the forward end of the lower inclined wall, a rotatable potato feed roller carried by the bin and disposed intermediate the lower inclined wall and the cutting knife, the roller having a plurality of spaced longitudinally extending potato receiving grooves formed in the periphery thereof.

5. A potato seed cutter comprising a bin having a lower inclined wall, the forward end of the lower wall terminating short of the forward end of the bin, a transversely extending rigid knife secured to the bin, a transversely extending rotatable roller disposed in the bin intermediate the cutting knife and the forward end of the lower inclined wall, means for turning said roller, the knife being curved arcuately for overlying the roller, the roller having a plurality of equi-distantly spaced longitudinally extending potato feeding grooves, the grooves being substantially circular in cross-section defining sharp cutting edges.

6. A potato seed cutter comprising a frame, a bin secured to the frame including side walls, end walls, and a lower inclined bottom wall terminating short of the forward end wall, a cutting mechanism carried by the bin disposed in front of the bottom wall, potato feeding means disposed intermediate the cutting means and the bottom wall, and potato retarding means carried by the side walls of the bin and disposed in rear of the potato feeding means.

JOSE SABINO MARQUEZ.